United States Patent
Bratt et al.

(10) Patent No.: US 9,262,798 B2
(45) Date of Patent: Feb. 16, 2016

(54) PARAMETER FIFO

(71) Applicant: Apple Inc., Cupertino, CA (US)

(72) Inventors: Joseph P. Bratt, San Jose, CA (US);
Peter F. Holland, Sunnyvale, CA (US);
Shing Horng Choo, San Francisco, CA (US); Timothy J. Millet, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 14/263,424

(22) Filed: Apr. 28, 2014

(65) Prior Publication Data

US 2014/0232732 A1    Aug. 21, 2014

Related U.S. Application Data

(62) Division of application No. 12/685,166, filed on Jan. 11, 2010, now Pat. No. 8,749,568.

(51) Int. Cl.
*G09G 5/39* (2006.01)
*G06T 1/60* (2006.01)
*G09G 5/36* (2006.01)
*G09G 5/14* (2006.01)

(52) U.S. Cl.
CPC *G06T 1/60* (2013.01); *G09G 5/363* (2013.01); *G09G 5/14* (2013.01); *G09G 2340/10* (2013.01); *G09G 2360/12* (2013.01); *G09G 2360/127* (2013.01)

(58) Field of Classification Search
CPC . G09G 5/363; G09G 5/393; G09G 2360/127; G09G 2340/16; G09G 5/39; G06F 13/28; G06F 5/10; G06T 1/60; G06T 1/20
See application file for complete search history.

(56) References Cited

U.S. PATENT DOCUMENTS

| | | | |
|---|---|---|---|
| 6,012,109 A | 1/2000 | Schultz | |
| 6,466,220 B1 | 10/2002 | Cesana et al. | |
| 6,677,954 B1 | 1/2004 | Jensen et al. | |
| 6,864,900 B2 | 3/2005 | Wasserman et al. | |
| 7,711,200 B2 | 5/2010 | Ouzilevski et al. | |
| 7,839,410 B1 | 11/2010 | Brown et al. | |
| 8,051,222 B2 * | 11/2011 | Kallam et al. | G06F 13/28 710/110 |
| 8,749,568 B2 | 6/2014 | Bratt et al. | |
| 2009/0296699 A1 * | 12/2009 | Hefty | G06F 13/385 370/389 |

OTHER PUBLICATIONS

International Search Report from PCT/US2011/020259, mailed Apr. 4, 2011, 12 pages.

* cited by examiner

*Primary Examiner* — Hau Nguyen
(74) *Attorney, Agent, or Firm* — Meyertons, Hood, Kivlin, Kowert & Goetzel, P.C.; Lawrence J. Merkel

(57) ABSTRACT

A graphics system may include one or more processing units for processing a current display frame, each processing unit including a plurality of parameter registers for storing parameter settings used in processing the current display frame. A parameter buffer in the graphics system may store frame packets, with each frame packet containing information corresponding to parameter settings to be used for at least one display frame. A control circuit coupled to the buffer and to the one or more processing units may retrieve and process a top frame packet from the parameter buffer to update one or more of the parameter registers according to the contents of the top frame packet. The control circuit may issue DMA requests to fill the parameter buffer with frame packets transferred from system memory, where the frame packets may be written by an application (or software) executing on a central processing unit.

20 Claims, 7 Drawing Sheets

| 31 | 30 | 29 | 28:26 | 25:16 | 15:0 |
|---|---|---|---|---|---|
| HF | Sync | PFint |  | Packet size [9:0] | Frame pointer [15:0] |

PARAMETER FIFO

This application is a divisional application of U.S. patent application Ser. No. 12/685,166, filed on Jan. 11, 2010, which is incorporated by reference herein in its entirety.

BACKGROUND

1. Field of the Invention

This invention is related to the field of graphical information processing, and more particularly to reading and writing registers that store image frame descriptors.

2. Description of the Related Art

Part of the operation of many computer systems, including portable digital devices such as mobile phones, notebook computers and the like, is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a "picture element", more generally referred to as a "pixel". For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. The intensity of each pixel can vary, and in color systems each pixel has typically three or four components such as red, green, blue, and black.

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically consists of a specified number of pixels according to the resolution of the image/video frame. Most graphics systems use frame buffers to store the pixels for image and video frame information. The term "frame buffer" therefore often denotes the actual memory used to hold picture/video frames. The information in a frame buffer typically consists of color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The total amount of the memory required for frame buffers to store image/video information depends on the resolution of the output signal, and on the color depth and palette size.

The frame buffers can be situated in memory elements dedicated to store image and video information, or they can be situated in the system memory. Consequently, system memory may be used to store a set of pixel data that defines an image and/or video stream for display on a display device. Typically, applications running in such a system can write the pixel data into the system memory, from where the pixel data may be obtained to eventually generate a set of image/video signals for generating the image on the display device. In such systems, fetching the frames (pixel information) from system memory may place high demands on the system, as other devices may also be competing for memory access. As con-sequence, a high bandwidth may be required from memory in order to keep up with the requests for data. In addition, as each system memory access requires a certain amount of processing power, requests for high volume pixel data may eventually result in premature battery depletion in battery-operated devices, such as mobile phones and notebook computers.

SUMMARY

In one set of embodiments, display pipes in a graphics processing/display system may support processing units that include registers programmable to define various parameters associated with a frame. Packets of parameter information may be queued in a parameter FIFO for use in subsequently fetched frames. A relatively large number of parameter settings may be stored, permitting numerous frames to be displayed with the correct parameter settings without requiring processor support during the display operations. The parameter FIFO may be coupled to a DMA engine through a host slave interface to automatically download parameter packets from memory as previously stored parameter packets are transmitted from the parameter FIFO, even further reducing the amount of processor activity required for programming the parameters.

In one set of embodiments, a display pipe may include one or more processing units to perform respective display pipe operations, each processing unit including parameter registers configured to store parameter settings used to process a current display frame. The display pipe may also include a buffer to store a plurality of frame packets, where each frame packet may contain one or more parameter settings to be used for at least one display frame. A control circuit may be coupled to the buffer and the parameter registers, and may operate to update the parameter registers using a first frame packet from the parameter buffer to process a subsequent frame. When updating parameter registers for processing the subsequent frame, the control circuit may put in an idle state the processing units while the parameter registers in those are being updated. Once the parameter registers have been updated, the control circuit may put those processing units in a run state. The control circuit may issue DMA requests to fill the buffer with the frame packets.

In one set of embodiments, a system may include a display pipe to provide image frames to a display controller, with the display pipe containing a parameter buffer to store frame packets, each of which contains one or more parameter settings to be used for at least one display frame. The system may also include system memory with portions of the system memory respectively designated as frame buffers, packet buffers, and transfer buffers. The frame buffers may store display frame information. Each given packet buffer may be associated with a given frame buffer, and each given packet buffer may store a respective frame packet that contains one or more parameter settings for the display frame information contained in the given frame buffer associated with the given packet buffer. Each given transfer buffer may be associated with a given packet buffer, and each given transfer buffer may store a respective DMA descriptor for transferring the respective frame packet contained in the given packet buffer associated with the given transfer buffer. The system may transfer a respective frame packet from a given packet buffer to the parameter buffer according to the respective DMA descriptor contained in the given transfer buffer associated with the given packet buffer. The system may also transfer a respective display frame information from a given frame buffer to the display pipe according to the respective DMA descriptor contained in the given transfer buffer associated with a given packet buffer that is associated with the given frame buffer. In one embodiment, the system may update a first frame buffer with new display frame information while display frame information is transferred from a second frame buffer, and it may also update a first packet buffer with a new frame packet while a frame packet is transferred from a second packet buffer.

In one set of embodiments, frame packets may be written into system memory, with each frame packet containing respective parameter settings to be used for displaying an image frame. DMA descriptors may also be written into the system memory, with each DMA descriptor associated with a respective memory location that contains a frame packet, and a DMA request may be issued from a display pipe to transfer a next frame packet from the system memory into a parameter buffer in the display pipe, which may provide image frames to a display controller. In response to the DMA request, the next frame packet may be transferred to the parameter buffer according to the DMA descriptor associated with the memory location that contains the next frame packet. The display pipe may include processing units having parameter registers to store parameter settings used to process a current display frame, and the parameter registers may be updated according to information comprised in the next frame packet, in preparation for displaying the frame associated with the next frame packet. While the next frame packet is transferred from one memory location to the parameter buffer, another memory location also designated to store a frame packet may be updated with a new frame packet, which may be transferred to the parameter buffer as part of a subsequent DMA transfer. DMA requests may be issued in response to the number of frame packets in the parameter buffer dropping below a specified value, and/or in response to the parameter buffer not containing a complete frame packet. Furthermore, DMA requests to transfer frame packets to the parameter buffer may be continually issued as long as there is space for a specified amount of data for a current size of the parameter buffer, while updating parameter registers in the display pipe according to information contained in frame packets in the parameter buffer.

BRIEF DESCRIPTION OF THE DRAWINGS

The following detailed description makes reference to the accompanying drawings, which are now briefly described.

FIG. 8 is a flow diagram illustrating how parameter registers in processing units of a display pipe may be updated using frame packets stored in a parameter buffer, according to one embodiment While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Figure 1:
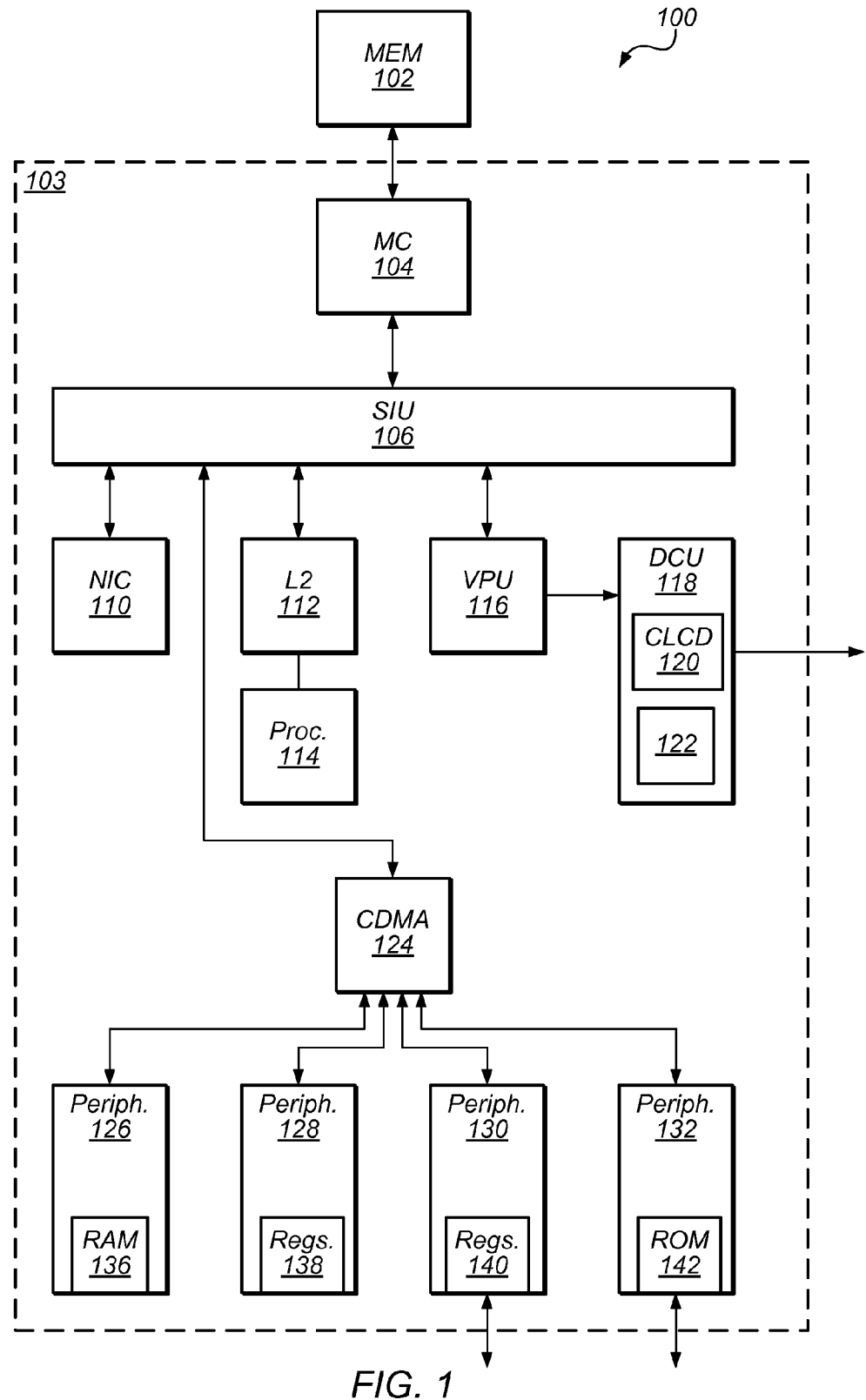
FIG. 1 is a block diagram of one embodiment of an integrated circuit that include a graphics display system.

Turning now to FIG. 1, a block diagram of one embodiment of a system 100 that includes an integrated circuit 103 coupled to external memory 102 is shown. In the illustrated embodiment, integrated circuit 103 includes a memory controller 104, a system interface unit (SIU) 106, a set of peripheral components such as components 126-128, a central DMA (CDMA) controller 124, a network interface controller (NIC) 110, a processor 114 with a level 2 (L2) cache 112, and a video processing unit (VPU) 116 coupled to a display control unit (DCU) 118. One or more of the peripheral components may include memories, such as random access memory (RAM) 136 in peripheral component 126 and read-only memory (ROM) 142 in peripheral component 132. One or more peripheral components 126-132 may also include registers (e.g. registers 138 in peripheral component 128 and registers 140 in peripheral component 130 in FIG. 1). Memory controller 104 is coupled to a memory interface, which may couple to memory 102, and is also coupled to SIU 106. CDMA controller 124, and L2 cache 112 are also coupled to SIU 106 in the illustrated embodiment. L2 cache 112 is coupled to processor 114, and CDMA controller 124 is coupled to peripheral components 126-132. One or more peripheral components 126-132, such as peripheral components 140 and 142, may be coupled to external interfaces as well.

SIU 106 may be an interconnect over which the memory controller 104, peripheral components NIC 110 and VPU 116, processor 114 (through L2 cache 112), L2 cache 112, and CDMA controller 124 may communicate. SIU 106 may implement any type of interconnect (e.g. a bus, a packet interface, point to point links, etc.). SIU 106 may be a hierarchy of interconnects, in some embodiments. CDMA controller 124 may be configured to perform DMA operations between memory 102 and/or various peripheral components 126-132. NIC 110 and VPU 116 may be coupled to SIU 106 directly and may perform their own data transfers to/from memory 102, as needed. NIC 110 and VPU 116 may include their own DMA controllers, for example. In other embodiments, NIC 110 and VPU 116 may also perform transfers through CDMA controller 124. Various embodiments may include any number of peripheral components coupled through the CDMA controller 124 and/or directly to the SIU 106. DCU 118 may include a display control unit (CLDC) 120 and buffers/registers 122. CLDC 120 may provide image/video data to a display, such as a liquid crystal display (LCD), for example. DCU 118 may receive the image/video data from VPU 116, which may obtain image/video frame information from memory 102 as required, to produce the image/video data for display, provided to DCU 118.

Processor 114 (and more particularly, instructions executed by processor 114) may program CDMA controller 124 to perform DMA operations. Various embodiments may program CDMA controller 124 in various ways. For example, DMA descriptors may be written to the memory 102, describing the DMA operations to be performed, and CDMA controller 124 may include registers that are programmable to locate the DMA descriptors in the memory 102. The DMA descriptors may include data indicating the source and target of the DMA operation, where the DMA operation transfers data from the source to the target. The size of the DMA transfer (e.g. number of bytes) may be indicated in the descriptor. Termination handling (e.g. interrupt the processor, write the descriptor to indicate termination, etc.) may be specified in the descriptor. Multiple descriptors may be created for a DMA channel, and the DMA operations described in the descriptors may be performed as specified. Alternatively, the CDMA controller 124 may include registers that are programmable to describe the DMA operations to be performed, and programming the CDMA controller 124 may include writing the registers.

Generally, a DMA operation may be a transfer of data from a source to a target that is performed by hardware separate from a processor that executes instructions. The hardware may be programmed using instructions executed by the processor, but the transfer itself is performed by the hardware independent of instruction execution in the processor. At least one of the source and target may be a memory. The memory may be the system memory (e.g. the memory 102), or may be an internal memory in the integrated circuit 103, in some embodiments. For example, a peripheral component 126-132 may include a memory that may be a source or target. In the illustrated embodiment, peripheral component 132 includes the ROM 142 that may be a source of a DMA operation. Some DMA operations may have memory as a source and a target (e.g. a first memory region in memory 102 may store the data to be transferred and a second memory region may be the target to which the data may be transferred). Such DMA operations may be referred to as "memory-to-memory" DMA operations or copy operations. Other DMA operations may have a peripheral component as a source or target. The peripheral component may be coupled to an external interface on which the DMA data is to be transferred or on which the DMA data is to be received. For example, peripheral components 130 and 132 may be coupled to interfaces onto which DMA data is to be transferred or on which the DMA data is to be received.

CDMA controller 124 may support multiple DMA channels. Each DMA channel may be programmable to perform a DMA via a descriptor, and the DMA operations on the DMA channels may proceed in parallel. Generally, a DMA channel may be a logical transfer path from a source to a target. Each channel may be logically independent of other DMA channels. That is, the transfer of data on one channel may not logically depend on the transfer of data on another channel. If two or more DMA channels are programmed with DMA operations, CDMA controller 124 may be configured to perform the transfers concurrently. For example, CDMA controller 124 may alternate reading portions of the data from the source of each DMA operation and writing the portions to the targets. CDMA controller 124 may transfer a cache block of data at a time, alternating channels between cache blocks, or may transfer other sizes such as a word (e.g. 4 bytes or 8 bytes) at a time and alternate between words. Any mechanism for supporting multiple DMA operations proceeding concurrently may be used.

CDMA controller 124 may include buffers to store data that is being transferred from a source to a destination, although the buffers may only be used for transitory storage. Thus, a DMA operation may include CDMA controller 124 reading data from the source and writing data to the destination. The data may thus flow through the CDMA controller 124 as part of the DMA operation. Particularly, DMA data for a DMA read from memory 124 may flow through memory controller 104, over SIU 106, through CDMA controller 124, to peripheral components 126-132, NIC 110, and VPU 116 (and possibly on the interface to which the peripheral component is coupled, if applicable). Data for a DMA write to memory may flow in the opposite direction. DMA read/write operations to internal memories may flow from peripheral components 126-132, NIC 110, and VPU 116 over SIU 106 as needed, through CDMA controller 124, to the other peripheral components (including NIC 110 and VPU 116) that may be involved in the DMA operation.

In one embodiment, instructions executed by the processor 114 may also communicate with one or more of peripheral components 126-132, NIC 110, VPU 116, and/or the various memories such as memory 102, or ROM 142 using read and/or write operations referred to as programmed input/output (PIO) operations. The PIO operations may have an address that is mapped by integrated circuit 103 to a peripheral component 126-132, NIC 110, or VPU 116 (and more particularly, to a register or other readable/writeable resource, such as ROM 142 or Registers 138 in the component, for example). It should also be noted, that while not explicitly shown in FIG. 1, NIC 110 and VPU 116 may also include registers or other readable/writeable resources which may be involved in PIO operations. PIO operations directed to memory 102 may have an address that is mapped by integrated circuit 103 to memory 102. Alternatively, the PIO operation may be transmitted by processor 114 in a fashion that is distinguishable from memory read/write operations (e.g. using a different command encoding then memory read/write operations on SIU 106, using a sideband signal or control signal to indicate memory vs. PIO, etc.). The PIO transmission may still include the address, which may identify the peripheral component 126-132, NIC 110, or VPU 116 (and the addressed resource) or memory 102 within a PIO address space, for such implementations.

In one embodiment, PIO operations may use the same interconnect as CDMA controller 124, and may flow through CDMA controller 124, for peripheral components that are coupled to CDMA controller 124. Thus, a PIO operation may be issued by processor 114 onto SIU 106 (through L2 cache 112, in this embodiment), to CDMA controller 124, and to the targeted peripheral component. Alternatively, the peripheral components 126-132 may be coupled to SIU 106 (much like NIC 110 and VPU 116) for PIO communications. PIO operations to peripheral components 126-132 may flow to the components directly from SIU 106 (i.e. not through CDMA controller 124) in one embodiment.

Generally, a peripheral component may comprise any desired circuitry to be included on integrated circuit 103 with the processor. A peripheral component may have a defined functionality and interface by which other components of integrated circuit 103 may communicate with the peripheral component. For example, a peripheral component such as VPU 116 may include video components such as a display pipe, which may include graphics processors, and a peripheral such as DCU 118 may include other video components such as display controller circuitry. NIC 110 may include networking components such as an Ethernet media access controller (MAC) or a wireless fidelity (WiFi) controller. Other peripherals may include audio components such as digital signal processors, mixers, etc., controllers to communicate on various interfaces such as universal serial bus (USB), peripheral component interconnect (PCI) or its variants such as PCI express (PCIe), serial peripheral interface (SPI), flash memory interface, etc.

As mentioned previously, one or more of the peripheral components 126-132, NIC 110 and VPU 116 may include registers (e.g. registers 138-140 as shown, but also registers, not shown, in NIC 110 and/or within VPU 116) that may be addressable via PIO operations. The registers may include configuration registers that configure programmable options of the peripheral components (e.g. programmable options for video and image processing in VPU 116), status registers that may be read to indicate status of the peripheral components, etc. Similarly, peripheral components may include memories such as ROM 142. ROMs may store data used by the peripheral that does not change, code to be executed by an embedded processor within the peripheral component 126-132, etc.

Memory controller 104 may be configured to receive memory requests from system interface unit 106. Memory controller 104 may be configured to access memory to complete the requests (writing received data to the memory for a write request, or providing data from memory 102 in response to a read request) using the interface defined the attached memory 102. Memory controller 104 may be configured to interface with any type of memory 102, such as dynamic random access memory (DRAM), synchronous DRAM (SDRAM), double data rate (DDR, DDR2, DDR3, etc.) SDRAM, Low Power DDR2 (LPDDR2) SDRAM, RAMBUS DRAM (RDRAM), static RAM (SRAM), etc. The memory may be arranged as multiple banks of memory, such as dual inline memory modules (DIMMs), single inline memory modules (SIMMs), etc. In one embodiment, one or more memory chips are attached to the integrated circuit 10 in a package on package (POP) or chip-on-chip (COC) configuration.

It is noted that other embodiments may include other combinations of components, including subsets or supersets of the components shown in FIG. 1 and/or other components. While one instance of a given component may be shown in FIG. 1, other embodiments may include one or more instances of the given component.

Figure 2:
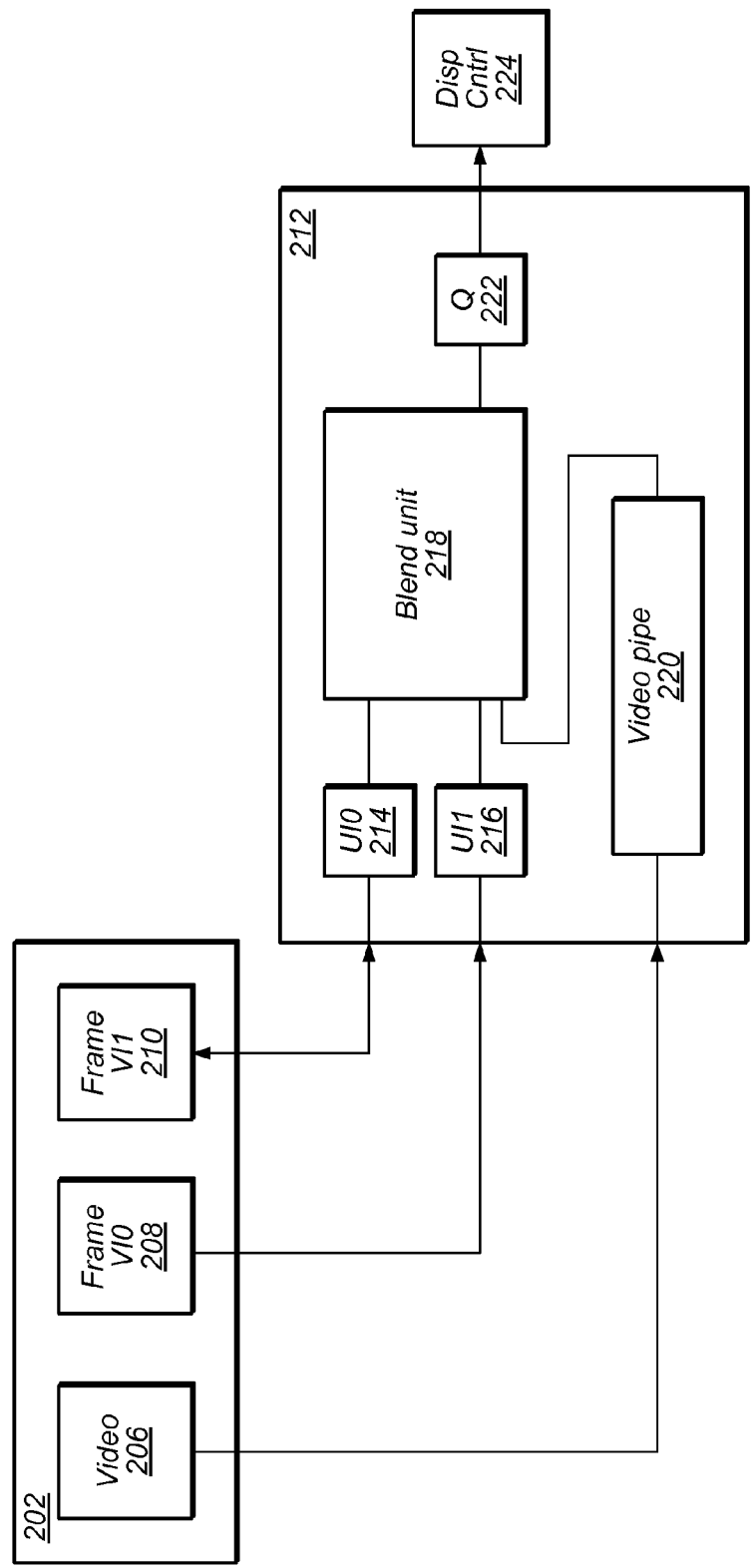
FIG. 2 is a block diagram of one embodiment of a graphics display system including system memory.

Turning now to FIG. 2, a partial block diagram is shown providing an overview of an exemplary system in which image frame information may be stored in memory 202, which may be system memory, and provided to a display pipe 212. As shown in FIG. 2, memory 202 may include a video buffer 206 for storing video frames/information, and one or more (in the embodiment shown, a total of two) image frame buffers 208 and 210 for storing image frame information. Display pipe 212 may include one or more user interface (UI) units, shown as UI 214 and 216 in the embodiment of FIG. 2, which may be coupled to memory 202 from where they may fetch the image frame data/information. A video pipe or processor 220 may be similarly configured to fetch the video data from memory 202, more specifically from video buffer 206, and perform various operations on the video data. UI 214 and 216, and video pipe 220 may respectively provide the fetched image frame information and video image information to a blend unit 218 to generate output frames that may be stored in a buffer 222, from which they may be provided to a display controller 224 for display on a display device (not shown), for example an LCD.

In one set of embodiments, UI 214 and 216 may include one or more registers programmable to define frame parameters such as base address, frame size, active regions of frames, and other parameters for the frames that may be stored in buffers 208 and 210. Active regions may represent those regions within an image frame that contain pixels that are to be displayed, while pixels outside of the active region of the frame are not to be displayed. In order to reduce the number of accesses that may be required to fetch pixels from frame buffers 208 and 210, when fetching frames from memory 202 (more specifically from frame buffers 208 and 210), UI 214 and 216 may fetch only those pixels of any given frame that are within the active regions of the frame, as defined by the contents of the registers within UI 214 and 216. The pixels outside the active regions of the frame may be considered to have an alpha value corresponding to a blend value of zero. In other words, pixels outside the active regions of a frame may automatically be treated as being transparent, or having an opacity of zero, thus having no effect on the resulting display frame. Consequently, the fetched pixels may be blended with pixels from other frames, and/or from processed video frame or frames provided by video pipe 220 to blend unit 218.

Figure 3:
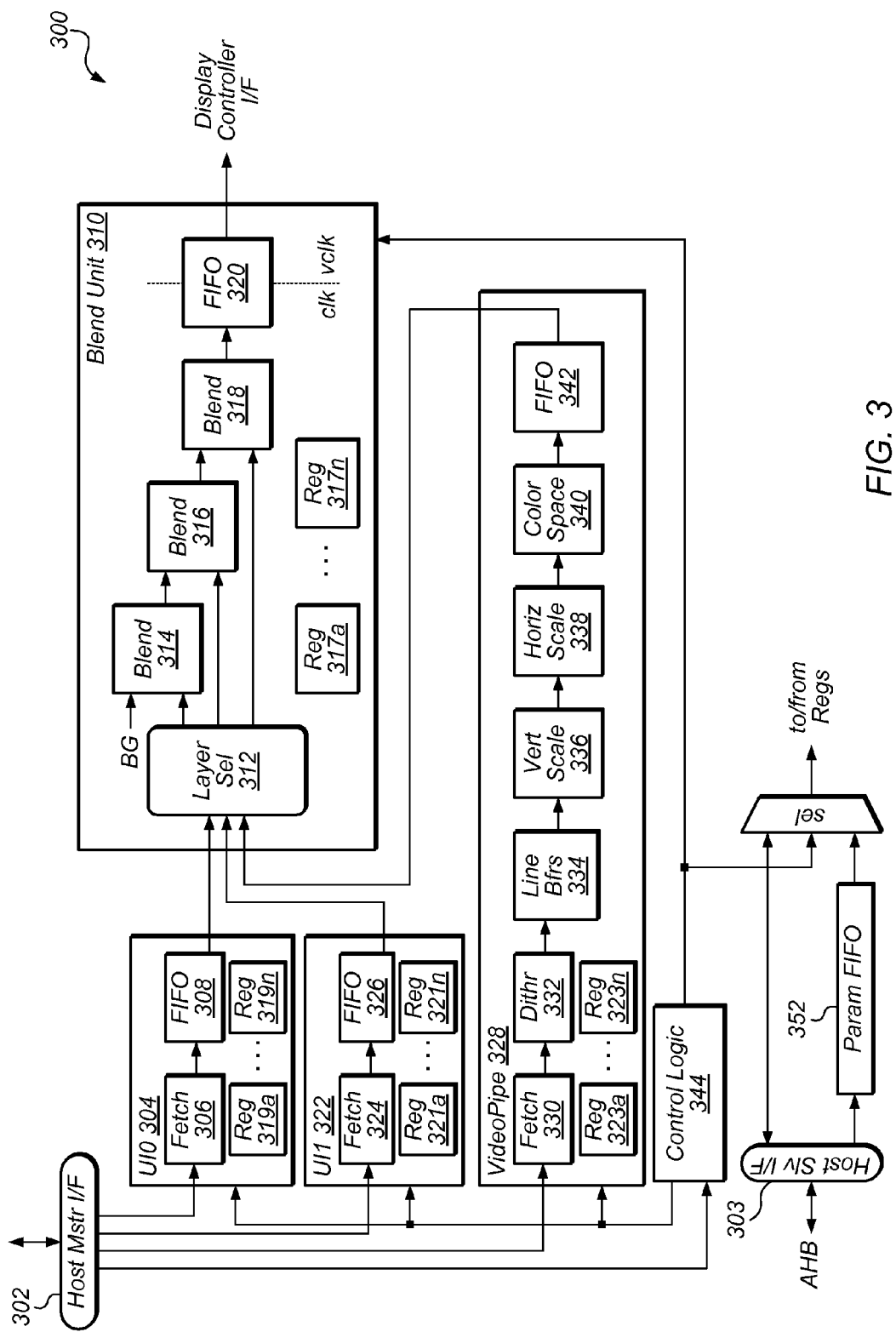
FIG. 3 is a block diagram of one embodiment of a display pipe in a graphics display system.

Turning now to FIG. 3, a more detailed logic diagram of one embodiment 300 of display pipe 212 is shown. In one set of embodiments, display pipe 300 may function to deliver graphics and video data residing in memory (or some addressable form of memory, e.g. memory 202 in FIG. 2) to a display controller or controllers that may support both LCD and analog/digital TV displays. The video data may be dithered, scaled, converted to RGB color space, and blended with up to a specified number (e.g. 2) RGB graphics (user interface) planes. Display pipe 300 may run in its own clock domain, and may provide an asynchronous interface to the display controllers to support displays of different sizes and timing requirements. Display pipe 300 may consist of one or more (in this case two) user interface (UI) blocks 304 and 322 (which may correspond to UI 214 and 216 of FIG. 2), a blend unit 310 (which may correspond to blend unit 218 of FIG. 2), a video pipe 328 (which may correspond to video pipe 220 of FIG. 2), a parameter FIFO 352, and Master and Slave Host Interfaces 302 and 303, respectively. The blocks shown in the embodiment of FIG. 3 may be modular, such that with some redesign, user interfaces and video pipes may be added or removed, or host master or slave interfaces 302 and 303 may be changed, for example.

Display pipe 300 may be designed to fetch data from memory, process that data, then presents it to an external display controller through an asynchronous FIFO 320. The display controller may control the timing of the display through a Vertical Blanking Interval (VBI) signal that may be activated at the beginning of each vertical blanking interval. This signal may cause display pipe 300 to initialize (Restart) and start (Go) the processing for a frame (more specifically, for the pixels within the frame). Between initializing and starting, configuration parameters unique to that frame may be modified. Any parameters not modified may retain their value from the previous frame. As the pixels are processed and put into output FIFO 320, the display controller may issue signals (referred to as pop signals) to remove the pixels at the display controller's clock frequency (indicated as vclk in FIG. 3).

In the embodiment shown in FIG. 3, each UI unit may include one or more registers 319a-319n and 321a-321n, respectively, to hold image frame information that may include active region information, base address information, and/or frame size information among others. Each UI unit may also include a respective fetch unit, 306 and 324, respectively, which may operate to fetch the frame information, or more specifically the pixels contained in a given frame from memory, through host master interface 302. In one set of embodiments, fetch units 306 and 324 may only fetch those pixels of any given frame that are within the active region of the given frame, as defined by the contents of registers 319a-319n and 321a-321n. In other embodiments, fetch units 306 and 324 may fetch all the pixels, depending on the system configuration. The fetched pixels may be fed to respective FIFO buffers 308 and 326, from which the UI units may provide the fetched pixels to blend unit 310, more specifically to a layer select unit 312 within blend unit 310. Blend unit 310 may then blend the fetched pixels obtained from UI 304 and 322 with pixels from other frames and/or video pixels obtained from video pipe 328. The pixels may be blended in blend elements 314, 316, and 318 to produce an output frame or output frames, which may then be passed to FIFO 320 to be retrieved by a display controller interface coupling to FIFO 320, to be displayed on a display of choice, for example an LCD.

The overall operation of blend unit 310 will now be described. Blend unit 310 may be situated at the backend of display pipe 300 as shown in FIG. 3. It may receive frames of pixels from UI 304 and 322, and video pipe 328, and may blend them together layer by layer, through layer select unit 312. The final resultant pixels (which may be RGB of 10-bits each) may be queued up in output FIFO 320 at the video pipe's clock rate of clk, and fetched by a display controller at the display controller's clock rate of vclk. The sources to blend unit 310 (UI 304 and 326, and/or video pipe 328) may provide the pixel data and per-pixel Alpha values (which may be 8-bit and define the transparency for the given pixel) for an entire frame with width, display width, and height, display height, in pixels starting at a specified default pixel location, (e.g. 0,0). Blend unit 310 may functionally operate on a single layer at a time. The lowest level layer may be defined as the background color (BG, provided to blend element 314). Layer 1 may blend with layer 0 (at blend element 316). The next layer, layer 2, may blend with the output from blend element 316 (at blend element 318), and so on until all the layers are blended. For the sake of simplicity, only three blend elements 314-318 are shown, but display pipe 300 may include more or less blend elements depending on the desired number of processed layers. Each layer (starting with layer 1) may specify where its source comes from to ensure that any source may be programmatically selected to be on any layer. As mentioned above, as shown, blend unit 310 has three sources (UI 304 and 322, and video pipe 328) to be selected onto three layers (using blend elements 314-318). A CRC (cyclic redundancy check) may also be performed on the output of blend unit 310. Blend unit 310 may also be put into a CRC only mode, where only a CRC is performed on the output pixels without them being sent to the display controller.

Each source (UI 304 and 322, and video pipe 328) may provide a per pixel Alpha value. The Alpha values may be used to perform per-pixel blending, may be overridden with a static per-frame Alpha value (e.g. saturated Alpha), or may be combined with a static per-frame Alpha value (e.g. Dissolve Alpha). Any pixel locations outside of a source's valid region may not be used in the blending. The layer underneath it may show through as if that pixel location had an Alpha of zero. An Alpha of zero for a given pixel may indicate that the given pixel is invisible, and will not be displayed.

In one set of embodiments, using fetch unit 330, video pipe 328 may fetch video frame data/information from memory through host master interface 302, in various formats, which may be YCbCr formats, and may insert random noise (dither) into the samples (dither unit 332), scale that data in both vertical and horizontal directions (scalers 336 and 338) after buffering the data (buffers 334), and convert the data to the RGB Color Space (color space converter unit 340). The RGB data may then be buffered (FIFO 342), and sent to blend unit 310 to be blended with other RGB planes, as previously discussed.

In one set of embodiments, a parameter FIFO 352 may be used to store the programming information for registers 319a-319n, 321a-321n, 317a-317n, and 323a-323n. Parameter FIFO 352 may be filled with this programming information by control logic 344. In the embodiment shown in FIG. 3, control logic 344 may issue DMA read requests to the memory through host master interface 302, and parameter FIFO 352 may be filled with the programming information by way of the DMA read requests through an advanced high-performance bus (AHB) via host slave interface 303. Parameter FIFO 352 may be used to perform parameter updates, for example by writing the various registers within the different functional units that are included in display pipe 300. Control logic 344 may facilitate the register write operations as defined by the programming information retrieved from parameter FIFO 352, as will be further described below.

As mentioned above, control logic 344 may control the updating of the control parameters for the processing units (e.g. for video pipe 328, user interfaces 304 and 322, etc.) and may also interface with a target display controller (the interfacing not explicitly shown in FIG. 3) to control the starting and stopping of the processing units. The processing units (user interfaces 304 and 322, blend unit 310, video pipe 328, etc.) may operate on a frame-by-frame basis. At the beginning of each frame the following steps may take place: the given processing unit for which the frame parameters are to be updated (e.g. video pipe 328, etc.) may be put in an idle state, the programmable parameters may be updated, the processing unit may be put in a run state, and each processing unit involved in the display operation may complete its operations for one frame. Display pipe 300 may be operated to run in one of many modes. One possible mode may be a manual mode, in which each frame may be software controlled through interrupts from display pipe 300 and subsequent PIO updates of the parameters. Another possible mode may be an automatic mode (or auto mode), in which the parameters for multiple frames may be queued up in a FIFO, previously referenced as parameter FIFO 352, and the beginning of each frame may be controlled by the timing signals provided by the display controller.

In manual mode, the starting, stopping, and monitoring functions of each processing unit (as previously indicated, "processing unit" here refers to any and all of the processing units included in display pipe 300, such as video pipe 328, blend unit 310, user interface units 304 and 322, etc.) may be accomplished through PIO reads and writes on host slave bus via interface 303, and through interrupts. In general, a processing unit in this mode may be configured through PIO reads and writes. After the parameters are updated, the given processing unit may be put into a run state. Processing units may be individually enabled to indicate which processing unit is to run operations. For example, if only one of UI units 304 and 322 is active, for example UI 304, then only UI 304 and blend unit 310 may be instructed to run. When the next vertical blanking interval occurs the processing unit may be returned to an idle state. In addition, all FIFOs, state machines, counters, etc. may be reset, while the configuration registers may be left untouched. At this point the configuration registers (e.g. registers 319a-319n, register 317a-317n) may be updated, and the processing units instructed to run again for the next frame. As previously mentioned, parameter FIFO 352 may provide a buffer for the configuration state when operating in auto mode. In one set of embodiments, manual mode may be useful when complete control of display pipe 300 is required (e.g. during debug operations). When efficient system operation and reduced power consumption is desired, the auto mode may be preferably used.

As mentioned above, in auto mode, parameter FIFO 352 may be used to contain a stream of configuration register writes, which may be in the form of what is referenced herein as frame packets. Frame packets may be in essence packets of parameter information, or register writes for writing packets of parameter information for a number of frames without host processor intervention. When a vertical blanking interval (VBI) occurs from the display controller, the processing units may be instructed to automatically restart (e.g. all FIFOs, state machines, counters, etc.), while leaving the configuration registers (e.g. registers 319a-319n, etc.) untouched. At this point, the configuration register writes for the current frame may be popped (i.e. retrieved) from parameter FIFO 352. After the final register write from parameter FIFO 352 for the given frame has taken place, the processing units may be automatically instructed to run, to begin operation of the involved processing units for the given frame. In one set of embodiments, the processing units may be individually enabled for auto processing, and only the enabled processing units may be instructed to run following the register update. In one set of embodiments, following a hardware reset, display pipe 300 may start operating in manual mode. Display pipe 300 may be placed into auto mode for normal operation, or as desired.

As mentioned above, parameter FIFO 352 may contain register writes to configure various units within display pipe 300 (e.g. UI 304, UI 322, video pipe 328, etc.) without host processor intervention, for example without any intervention required by processor 114 in exemplary system shown in FIG. 1. Parameter FIFO may be filled through a DMA stream, but it may also be filled through PIO Writes. A parameter FIFO control register may be configured (for example in control logic 344) to indicate whether parameter FIFO processing is enabled, and for which of the units configured within display pipe 300 it is enabled. Parameter FIFO 352 may contain packets (also referred to as frame packets, as previously mentioned), with each packet containing the information, (e.g. parameter settings) for one frame (or field). Frames may be tracked and counted via a frame count (FC) value, which may be defined by the content of a register of specified width, e.g. a 16-bit register, that may be read or written through accesses via host slave interface 303, and may be incremented whenever a VBI (vertical blanking interval) occurs, or may be written from the frame header itself. A VBI may result in the frame count being incremented before comparison to the frame pointer takes place.

Figures 4, 5:
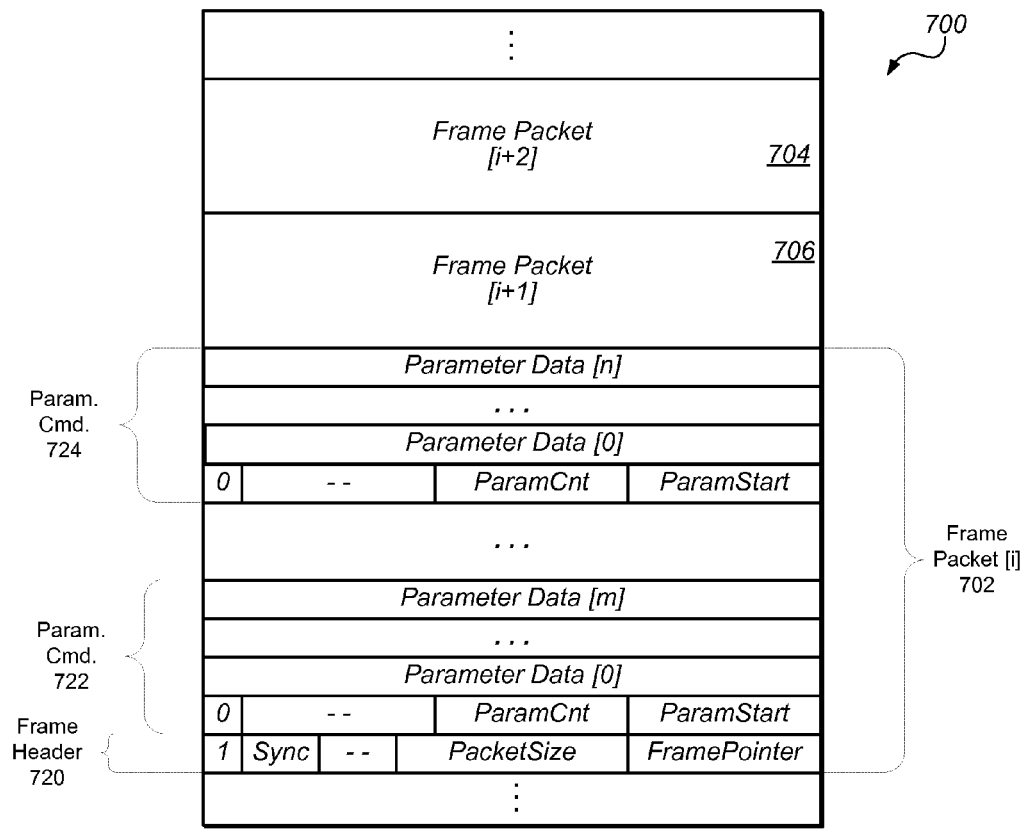
FIG. 4 is an illustration of one embodiment of a parameter FIFO format.
FIG. 5 is an illustration of one embodiment of a parameter FIFO header format.

Turning now to FIG. 4, one possible embodiment 700 of the structure of parameter FIFO 352 is shown, illustrating how frame packets and parameter commands may reside in parameter FIFO 352. As seen in the embodiment of FIG. 4, details are shown for the exemplary structure of a frame packet 702 detailing the structure of frame packet 702, which may be situated next to frame packet 706, which may itself be situated next to frame packet 704, etc. Additional frame packets may of course be situated in parameter FIFO 352 above frame packet 704 and below frame packet 702. In one set of embodiments, each parameter packet may contain a frame header 720 followed by zero or more parameter commands (722 to 724, with additional parameter commands that may be situated in between parameter commands 722 and 724 not shown), which may issue the configuration parameter writes.

FIG. 5 shows the configuration of one possible embodiment 400 of frame header 720 (the contents of which are also partially illustrated in FIG. 4). Frame header 400 may be designated as the first specified number of bits within a frame packet, e.g. the first 32-bit word of a frame packet, and may contain synchronization information determining whether or not parameter commands subsequent to the frame header in the frame packet are to be issued. As shown in FIG. 4, frame header 400 is a 32-bit word. The most significant bit (MSB—in this case bit 31) may be a header flag indicating that this word is a frame header as opposed to a parameter command. The next bit (in this case bit 30) may contain a Sync bit used to synchronize the frame count to the frame pointer, which may be of specified size (more specifically a specified number of bits), e.g. a 16-bit frame pointer implemented in the embodiment as the 16 least significant bits (LSB—in this case bits 15:0). The frame pointer may be compared to the contents of a frame count register. The result of the comparison may be used in conjunction with the Sync bit in a Frame synchronization process. A packet size field (bits 25:16 in this case) may be used to indicate how much information, e.g. how many words are contained in the frame packet, not including the header. In alternate embodiments the frame header may also be counted, which may then be reflected in the packet size field, which may also be interpreted accordingly. Frame header 400 may also include (at bit position 29) an interrupt bit which, when enabled, may effect the generation of an interrupt when this packet is processed (on VBI) or is discarded.

As mentioned above with reference to FIG. 4, parameter commands (722 to 724) may be entries in parameter FIFO 352, and may contain data for updating a processing unit's parameter registers (e.g. registers 317, 319, 321, and 323, collectively referring to all respective registers within each processing unit, in FIG. 3). The first specified number of bits (e.g. a 32-bit word) of a parameter command may be a control word, which may contain an address (defining the start of the parameters, noted as ParamStart in FIG. 4), and a count (defining a count of the parameters, noted as ParamCnt in FIG. 4), collectively specifying how many words of data are contained in the parameter command following the control word, as illustrated in FIG. 4 for both explicitly detailed parameter commands (722 and 722) in frame packet 702 in FIG. 4. More specifically, the parameter start may specify the starting location of the group of parameters to be updated, with updating of the parameters starting at the location defined (or specified) by the value of ParamStart and continuing with the sequential addresses that may follow for a number of words defined by the value of ParamCnt. It should be noted that "word" in this instance merely references the width of parameter FIFO 352 (as embodied by the structure shown in FIG. 4), where each parameter data (e.g. Parameter Data [0], Parameter Data [n]) is of a specified length. Thus, the value of ParamCnt defines (specifies) the number of these units of parameter data, where the unit may be of any length specified as desired and based on design considerations pertaining to the width of parameter FIFO 352 and/or the given structural embodiment, one example of which is embodiment 700 shown in FIG. 4.

Figure 8:
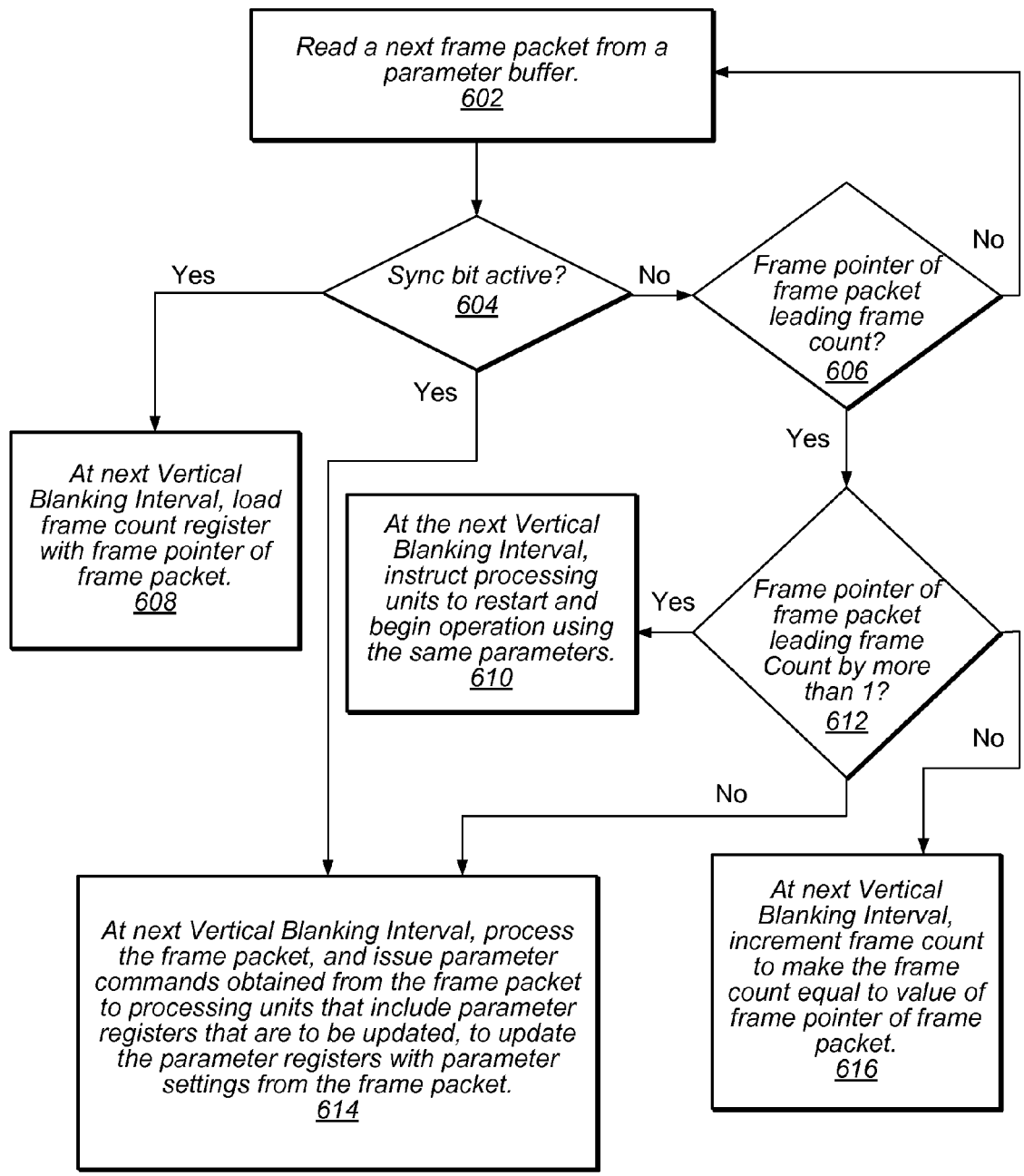

Processing of the frame packets from parameter FIFO 352 may be performed as shown in FIG. 8, according to one embodiment. A top frame packet (i.e. a next frame packet to be processed in the FIFO) may be checked to see if the frame packet should be processed at the next VBI (602). Processing of a given frame packet may be interpreted as issuing the parameter commands of the given frame packet to the processing units in which the register contents are to be updated. If the frame packet header contains an active Sync bit (604—Yes), then, at the next VBI, the frame count register may be loaded with the frame pointer from the frame header of the given packet (608), and the packet may be processed and popped from the FIFO (614). If the Sync bit in the frame header of the given frame packet is inactive (604—No), the frame pointer of the frame header may be compared against the current frame count (606), to determine if the current frame packet is lagging, leading, or is concurrent with the frame count. If the frame pointer is lagging or is concurrent with the frame count (606—No), then the time for the given frame packet has passed. The given frame packet may therefore be discarded, and the next frame packet may be checked (602). If the frame pointer leads the frame count by a specified amount, e.g. one count (612—No), then the given frame packet may be processed at the next VBI (614). When the next VBI occurs, the frame count may be incremented to make the frame count equal to the (value of the) frame pointer (616). If the frame pointer leads the frame count by more than the specified amount, e.g. by more than one count (612—Yes), then the given frame packet may be ahead of the current frame time. When the next VBI occurs, the processing units may be instructed to restart and begin operation using the same parameters (610). If a VBI occurs and parameter FIFO 352 is empty, the processing units may be instructed to restart and begin operation using the same parameters. If a VBI occurs and parameter FIFO 352 does not contain a complete frame packet, or frame packets are being discarded, then the processing units may be instructed to restart and begin operation using the same parameters. After a VBI occurs, the current frame header for the given frame packet that is being processed may be available as a register.

In one set of embodiments, parameter FIFO status registers may be set up (e.g. within display pipe 300 or at any other location within the system, e.g. within system 103 of FIG. 1) to provide information about the current number of frame packets in parameter FIFO 352, also indicating the current packet header that is being processed. The header flag (HF in FIG. 5) of the frame packet header may be used to determine if a full packet is being written into parameter FIFO 352. If the HF is incorrect, the packet may not be written to parameter FIFO 352. In addition, the HF and parameter count (PC) fields may be monitored to make sure that parameter commands (PCMD) with the right amount of data are written to parameter FIFO 352. In one embodiment, if due to a programming error parameter FIFO 352 is corrupted, it may be programmatically flushed. This may be accomplished by writing specified information indicative of a programming error to a parameter FIFO flush register. If a frame packet is being processed (i.e. parameters are being updated) when a flush occurs, the processing may be stopped immediately as if the packet completed, and the enabled processing units may be instructed to begin executing. A flush at any other time may operate to clear out all the entries in parameter FIFO 352. It should be noted that the DMA Channel may need to be stopped when parameter FIFO 352 is flushed so that a DMA request does not re-corrupt parameter FIFO 352.

As previously mentioned, parameter FIFO may be loaded through DMA operations. A DMA control register may be set up (e.g. within system 103 of FIG. 1) to specify whether DMA is enabled, the amount of parameter FIFO 352 that is used (FIFO size, or FS for short), a threshold specifying when a DMA request is issued (referred to as a watermark), and a burst size (or BS for short) indicating how much data is expected when a DMA request is issued. In one set of embodiments, when DMA is enabled, a request may be sent out if the number of entries in parameter FIFO is less than or equal to the watermark value or parameter FIFO 352 does not contain a complete frame packet. DMA requests may be continually issued as long as there is space for a burst amount of data (BS) for the current size (FS) of parameter FIFO 352. When the space limit has been reached, DMA requests may stop until the number of entries in parameter FIFO 352 drops below the watermark or parameter FIFO 352 does not contain a complete frame packet.

Figure 6:
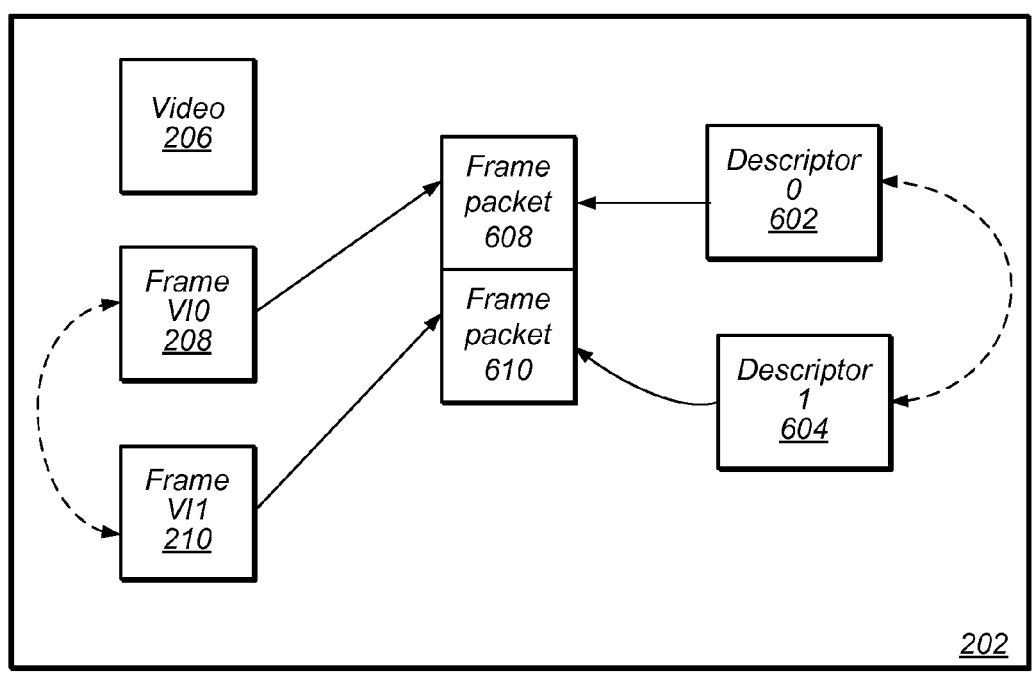
FIG. 6 is a block diagram of one embodiment of how frame buffers, packet buffers, and DMA descriptor buffers may be related in system memory.

DMA requests to load parameter FIFO 352 may be issued in a variety of ways. In one embodiment, DMA descriptors containing the DMA transfer information may be written to memory (e.g. memory 202). FIG. 6 shows one embodiment of how memory 202 may be functionally divided to store DMA descriptors 602 and 604. While only two DMA descriptors are shown in this embodiment, alternate embodiments may include more DMA descriptors operating as will be further described below with respect to DMA descriptors 602 and 604. As shown in FIG. 6, memory 202 may also be used to store the frame packets (608 and 610), associated with the image frame buffers (208 and 210). As with the image frames and DMA descriptors, while only two frame packets are shown, various embodiments may feature as many individually accessible frame packets in memory as desired or specified based on various system and performance considerations. In addition, a frame packet or frame packets may also be associated with video buffer 206, and configured in a manner similar as the frame packets shown for the illustrated frame buffers.

Referring again to FIG. 6, SW (executing on processor 114 of FIG. 1, for example) may write the image frame information into frame buffers 208 and 210, while also writing corresponding frame packets that contain register write information and data for updating registers in UI units 304 and/or 322 (e.g. registers 319*a*-319*n* and/or 321*a*-321*n*) in display pipe 300. As shown, each respective frame packet may be associated with a respective frame (buffer), and each DMA descriptor may be associated with a respective memory location that stores the respective frame packet. In one set of embodiments, while one frame packet (e.g. 608) is transferred from memory 202 to parameter FIFO 352, and/or while the associated frame pixel information (from frame buffer 208) is transferred from memory to display pipe 300, the other frame packet (610) may be written to memory 202, and associated frame pixel information may be written to frame buffer 210. The transfer(s) to display pipe 300 may be performed according to DMA descriptor 602. Subsequently, the next DMA request issued may be according to DMA descriptor 604, transferring frame packet 610 into parameter FIFO 352, and/or transferring frame pixel information from frame buffer 210 to display pipe 300. Simultaneously, the other frame packet (608) may be written to memory 202, and associated frame pixel information may be written to frame buffer 208.

In such a manner, frame packets and frame pixel information may be transferred to display pipe 300 using only DMA descriptors 602 and 604, alternating between the two, and updating information in one frame buffer as well as updating the associated frame packet while the other frame packet and/or information from the other frame buffer is transferred. It should also be noted that in case the frame packets associated with the frame buffers do not change over the course of a given number of frames, by transferring the frame packets into parameter FIFO 352 using DMA descriptors 602 and 604, additional CPU cycles may be saved by SW not having to write new frame packet information into locations 608 and 610, while still providing a means of transferring the required frame packets into parameter FIFO 352.

Figure 7:
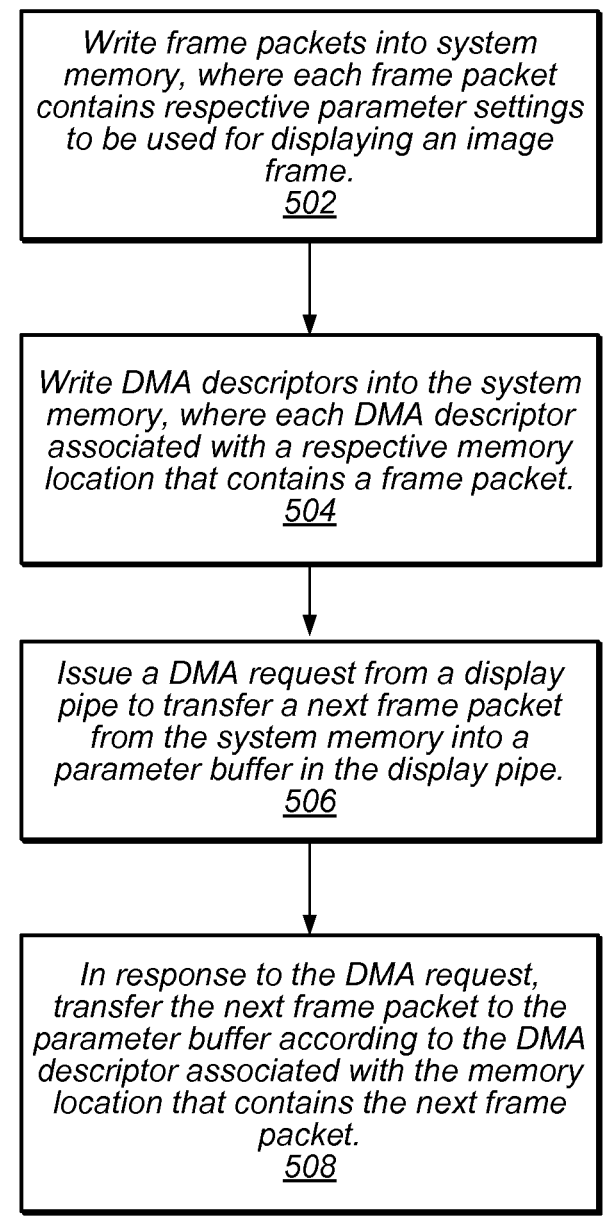
FIG. 7 is a flow diagram illustrating how frame packets may be written to system memory and moved from system memory to a parameter buffer in a display pipe, according to one embodiment.

Turning now to FIG. 7, one embodiment of a method is show for updating parameter registers in a display pipe based on the various principles described above, according to one embodiment. Frame packets may be written into system memory (e.g. system memory 202 as shown in FIGS. 1 and 6), with each frame packet containing respective parameter settings to be used for displaying an image frame (502). DMA descriptors may also be written into the system memory, with each DMA descriptor associated with a respective memory location that contains a frame packet (504). A DMA request may be issued from a display pipe (e.g. by control logic 344 shown in FIG. 3) to transfer a next frame packet from the system memory into a parameter buffer (e.g. parameter FIFO 352) in the display pipe (506). In response to the DMA request, the next frame packet may be transferred to the parameter buffer according to the DMA descriptor associated with the memory location that contains the next frame packet (508). The display pipe may include parameter registers to store parameter settings used to process a current display frame, and subsequent to transferring the next frame packet to the parameter buffer, the next frame packet may be popped from the parameter buffer and processed to update the parameter registers according to information contained in the next frame packet.

Numerous variations and modifications will become apparent to those skilled in the art once the above disclosure is fully appreciated. It is intended that the following claims be interpreted to embrace all such variations and modifications.

What is claimed is:

1. A graphics system comprising:
a display pipe configured to provide image frames to a display controller, the display pipe comprising:
a parameter buffer configured to store a plurality of frame packets, each frame packet comprising one or more parameter settings to control processing of at least one display frame; and
system memory comprising:
a plurality of frame buffers configured to store display frame information;
a plurality of packet buffers, each given packet buffer of the plurality of packet buffers associated with a given frame buffer of the plurality of frame buffers, wherein each given packet buffer is configured to store a respective frame packet that comprises one or more parameter settings for the display frame information contained in the given frame buffer associated with the given packet buffer; and
a plurality of transfer buffers, each given transfer buffer of the plurality of transfer buffers associated with a given packet buffer, wherein each given transfer buffer is configured to store a respective direct memory access (DMA) descriptor for transferring the respective frame packet contained in the given packet buffer associated with the given transfer buffer;
wherein the system is configured to transfer a respective frame packet from a given packet buffer to the parameter buffer according to the respective DMA descriptor contained in the given transfer buffer associated with the given packet buffer.

2. The graphics system of claim 1, further configured to transfer respective display frame information from a given frame buffer to the display pipe according to the respective DMA descriptor contained in the given transfer buffer associated with a given packet buffer that is associated with the given frame buffer.

3. The graphics system of claim 1 further configured to perform at least one of:
update a first frame buffer of the plurality of frame buffers with new display frame information while display frame information is transferred from a second frame buffer of the plurality of frame buffers; and
update a first packet buffer of the plurality of packet buffers with a new frame packet while a frame packet is transferred from a second packet buffer of the plurality of packet buffers.

4. The graphics system of claim 1 further configured to transfer the respective frame packet from the given packet buffer to the parameter buffer each time the display pipe is to provide a new frame to the display controller.

5. A method for controlling the displaying of image frames on a display device, the method comprising:
writing frame packets into system memory, wherein each frame packet of the frame packets comprises respective parameter settings to control displaying an image frame;
writing direct memory access (DMA) descriptors into the system memory, each DMA descriptor associated with a respective memory location that contains a frame packet;
issuing a DMA request from a display pipe to transfer a next frame packet of the frame packets from the system memory into a parameter buffer in the display pipe, wherein the display pipe is configured to provide image frames to a display controller;
in response to the DMA request, transferring the next frame packet to the parameter buffer according to the DMA descriptor associated with the memory location that contains the next frame packet.

6. The method of claim 5, further comprising updating parameter registers in the display pipe according to information comprised in the next frame packet, subsequent to transferring the next frame packet to the parameter buffer;
wherein the parameter registers are configured to store parameter settings used to process a current display frame.

7. The method of claim 5, wherein a first DMA descriptor of the DMA descriptors is associated with a first memory location containing a first frame packet of the frame packets and a second DMA descriptor of the DMA descriptors is associated with a second memory location containing a second frame packet of the frame packets;
wherein said transferring the next frame packet to the parameter buffer comprises transferring one of the first frame packet and the second frame packet responsive to which of the first DMA descriptor and the second DMA descriptor is invoked in the DMA request;

the method further comprising:
during the transferring of the next frame packet:
writing a new frame packet into the first memory location if the next frame packet is the second frame packet; and
writing a new frame packet into the second memory location if the next frame packet is the first frame packet.

8. The method of claim 5, wherein issuing the DMA request comprises issuing the DMA request in response to one or more of:
the number of frame packets in the parameter buffer dropping below a specified value; or
the parameter buffer not containing a complete frame packet.

9. The method of claim 5, further comprising continually issuing DMA requests to transfer frame packets to the parameter buffer as long as there is space for a specified amount of data for a current size of the parameter buffer, while updating parameter registers in the display pipe according to information contained in frame packets in the parameter buffer.

10. A graphics system comprising:
a display pipe configured to generate image frames according to image frame information;
a plurality of frame buffers configured to store the image frame information;
a plurality of packet buffers, wherein each respective packet buffer of the plurality of packet buffers is:
associated with a respective frame buffer of the plurality of frame buffers; and
configured to store respective one or more parameter settings corresponding to a respective image frame represented by the image frame information stored in the respective frame buffer that is associated with the respective packet buffer; and
a plurality of transfer buffers, wherein each transfer buffer of the plurality of transfer buffers is:
associated with a respective packet buffer; and
configured to store a respective direct memory access (DMA) descriptor for transferring the respective one or more parameter settings stored in the respective packet buffer associated with the transfer buffer;
wherein the graphics system is configured to transfer the respective one or more parameter settings from each given packet buffer to the display pipe according to the respective DMA descriptor stored in the respective transfer buffer associated with the given packet buffer.

11. The graphics system of claim 10, further comprising a processing unit configured to write the image frame information into the plurality of frame buffers.

12. The graphics system of claim 10, wherein the display pipe comprises a parameter buffer configured to store a plurality of frame packets, wherein each frame packet of the plurality of frame packets comprises respective one or more parameter settings to control processing of a corresponding image frame.

13. The graphics system of claim 12, wherein when transferring the respective one or more parameter settings from each given packet buffer to the display pipe, the graphics system is configured to transfer the respective one or more parameter settings from each given packet buffer to the parameter buffer.

14. The graphics system of claim 12, wherein the display pipe comprises a plurality of parameter registers configured to store parameter settings to control processing of a current display frame, wherein the graphics system is configured to update the plurality of parameter registers from the parameter buffer.

15. The graphics system of claim 14, wherein when updating the plurality of parameter registers from the parameter buffer, the graphics system is configured to update the plurality of parameter registers from the parameter buffer with parameter settings corresponding to a next display frame, wherein the next display frame is to be processed subsequent to processing the current display frame.

16. The graphics system of claim 15 wherein when updating the plurality of parameter registers from the parameter buffer with parameter settings corresponding to a next display frame, the graphics system is configured to use from the parameter buffer a first frame packet of the plurality of frame packets that comprises the parameter settings that control processing of the next display frame.

17. The graphics system of claim 16, wherein the display pipe comprises one or more processing units comprising the plurality of parameter registers and configured to perform respective display pipe operations;
wherein the graphics system is further configured to put in an idle state those processing units of the one or more processing units that comprise parameter registers of the plurality of parameter registers that are to be updated for processing the next display frame.

18. The graphics system of claim 17, wherein the graphics system is further configured to put in a run state those processing units of the one or more processing units that are currently in an idle state, once the parameter registers comprised in those processing units have been updated.

19. The graphics system of claim 16, wherein the display pipe comprises one or more processing units configured to perform respective display pipe operations, wherein the plurality of parameter registers are comprised in the one or more processing units;
wherein the graphics system is further configured to:
instruct the one or more processing units to automatically restart when a vertical blanking interval occurs, leaving the plurality of parameter registers comprised in the one or more processing units in their present state;
retrieve the first frame packet from the parameter buffer;
update the plurality of parameter registers according to information comprised in the first frame packet; and
subsequent to updating the parameter registers, instruct the one or more processing units to run.

20. The graphics system of claim 12, wherein the graphics system is configured to DMA requests to fill the parameter buffer with the plurality of frame packets.

* * * * *